United States Patent Office 3,313,968
Patented Apr. 11, 1967

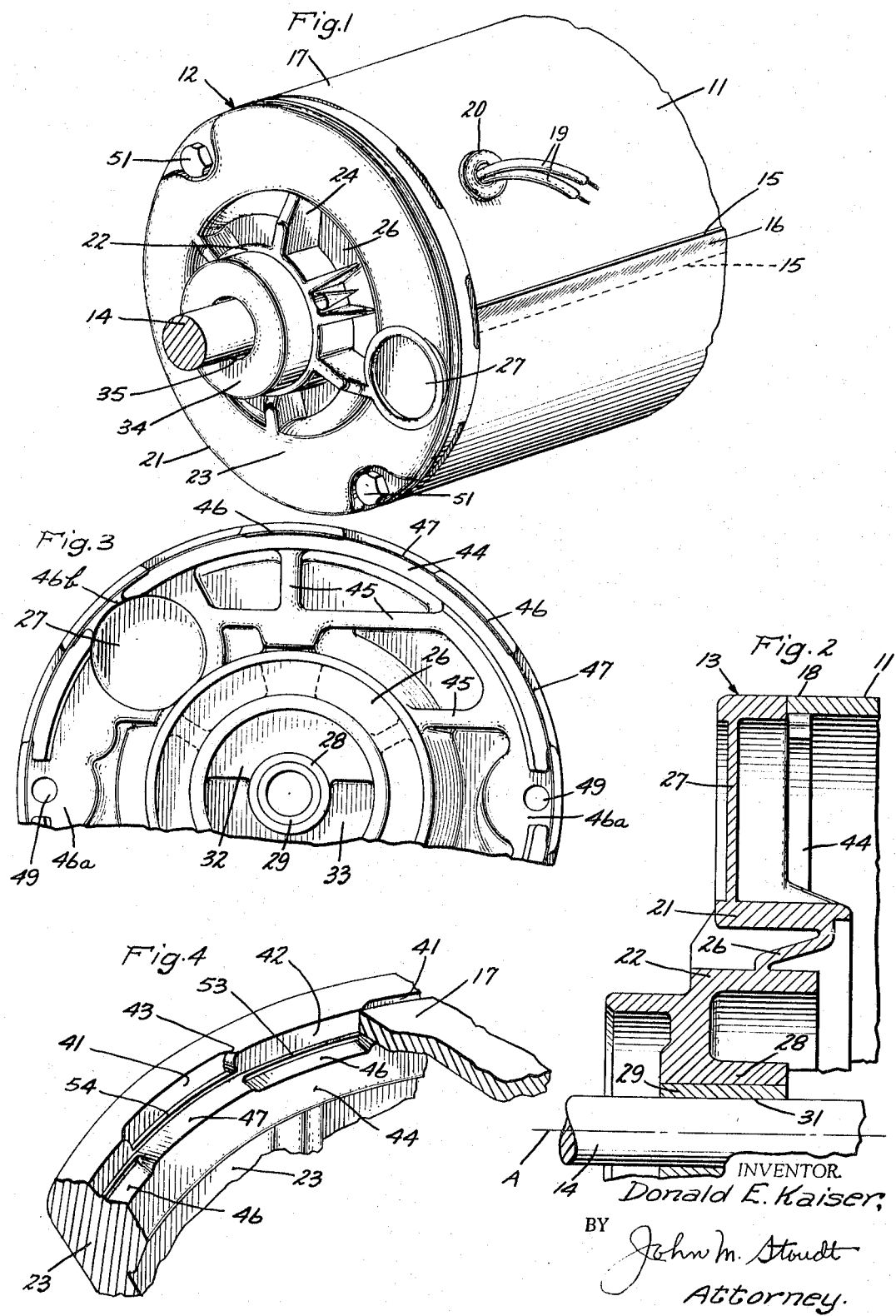

3,313,968
DYNAMOELECTRIC MACHINE FRAME
Donald E. Kaiser, Fort Wayne, Ind., assignor to General
Electric Company, a corporation of New York
Filed Apr. 1, 1964, Ser. No. 356,595
4 Claims. (Cl. 310—258)

The present invention relates to dynamoelectric machine frames and more particularly to frames having an improved connection between tubular shell formed of sheet material and an end frame arranged at one end thereof for supporting one side of the rotating part of the machine.

In the construction of certain dynamoelectric machines, it has become customary, primarily for reasons of economy and strength, to build the machine housing or frame with a central tubular shaped shell. This shell is usually fabricated from an elongated rectangular flat sheet stamped from suitable material such as steel, the sheet normally being rolled into a somewhat cylindrical form, such as that revealed in Patent 2,778,965, Feiertag et al. assigned to the same assignee as the present invention. The mating ends of the rolled sheet which overlap or abut are joined together by a weld running for the longitudinal length of the connection to provide a closed seam at that location. The stator core of the machine, such as that disclosed in U.S. Patents 2,151,561 and 2,267,414, both issued to W. J. Morrill, is mounted within the shell and attached thereto by a pressure fit, spot welding, or the like. An end frame or closure assembly abuts against the shell at each of its ends as by a continuous or uninterrupted rabbet connection to complete the machine frame. A number of through-bolts are used to secure the frame components firmly together. The end frames in turn each mount bearings which serve to support a rotor and its shaft for relative rotation with respect to the stator core and frame.

Unfortunately, the above desirable construction contains certain drawbacks, especially for those applications which require a machine, such as an electric motor of the totally enclosed type, having a rugged bearing mount provided by an end frame member formed of cast material. Typical of this type of application, by way of example, is in textile equipment where the driven loads vary in intensity and the environment in which the motor is utilized is laden with lint and other foreign matter.

In the past, considerable difficulty has been experienced during the mass production manufacture of these motors in achieving with desired consistency accurately aligned bearing and shaft components as well as concentricity between the rotor and stator to provide a generally uniform air gap. More specifically, during the assembly of these motors, it is essential that in order to produce the foregoing relationships the connection between the end frames and associated end of the shell be such that the bearing journals carried by the end frames have a co-axial relationship relative to one another and have a predetermined concentric relationship with respect to the axis of the motor and to the respective ends of the shell.

However, regardless of any accuracy which might have been obtained in the formation of a true circle of the internal shell surfaces during the rolling operation, when the seam is welded to produce the shell and the stator core is attached to the shell, considerable distortion or deflection occurs at the respective ends of the shell to form an irregular circumference of the internal surface. This distortion adversely affected the accuracy of the connection made between the end frame and shell, which in turn, tended to cause the bearings to be off-center from the true axis of the motor thus producing misalignment of the rotatable and stationary parts and creating interference with the freedom of shaft rotation. In addition, in some cases, the misalignment was so great as to create the well-known frozen shaft condition and contact between the rotor and stator core even though the motor was designed to have an air gap of 12 mils.

In an effort to correct this situation, the internal surface at each end of the shell, as well as the mating part of the end frame, was machined in an attempt to obtain close tolerances. However, in spite of these attempts, the diameter across the shell in some cases varied as much as 20 mils between the maximum and minimum dimensions and the misalignment conditions were not solved. In addition, with the end frames having members formed of cast material, a totally enclosed, yet structurally strong and stiff, connection was difficult to obtain while retaining economy in the casting operation.

Accordingly, it is the general object of my invention to provide an improved dynamoelectric machine frame construction, and it is a more specific object to provide an improved machine frame which overcomes the problems and deficiencies mentioned above.

Another object of the present invention is the provision of an improved dynamoelectric machine frame construction which is easily assembled and insures excellent co-axial alignment of internal bearing surfaces with one another and a true concentric relation of these surfaces with respect to the axis of shaft rotation with a high degree of consistency from one machine to another at a relatively low unit cost.

It is still another object of my invention to provide an improved frame construction having a central shell fabricated from sheet material and at least one end frame mating with the shell at one of its ends, in which any deflection from a true circle occurring at the internal surface of the shell ends tends to be corrected by the end frame to produce a totally enclosed, structurally strong connection.

In carrying out the objects of the invention in one form, I provide a dynamoelectric machine with an improved stationary frame which mounts a bearing for rotatably supporting the rotor shaft of the machine. The frame includes a centrally disposed tubular shell surrounding the machine components which is closed at each end by a cast end frame member mounting a bearing for journalling an end of the shaft. This member is formed with a radial wall terminating in a generally circular periphery and is provided with an annular, axially extending, flange arranged inwardly of the wall. This flange, in turn, has a number of axially spaced apart radial interruptions defining lands therebetween with each land being formed with a transversely curved radial outer surface. The curvature of the outer surfaces for the lands are in effect arcs of the same circle having a common center of revolution at the rotational axis of the machine. In addition, the radial wall of the member includes axial depressions arranged in communication with substantially all of the lands, with the depressions and associated lands being substantially angular co-extensive in length such that the radial wall has axially protruding radial surfaces provided intermediate the lands. The outer surfaces of the lands have structurally greater stiffness than the associated end of the shell and furnish an interfering fit with the shell which tends to deflect the shell between adjacent lands and force the shell end into a circular form having a center at the rotational axis of the machine. By locating the outer surfaces of all the lands no further away from the rotational axis than their associated axial depressions and forming the cooperating radial surfaces and adjacent lands in axial overlapping relation, the connection can be made generally imperforate or totally enclosed.

Due to the type of connection provided by the present invention between the end frame and shell and the corrective deflection imparted to the shell ends by the interaction of the inherently stronger adjacent lands of the end frame, the rotational axis of the machine in effect serves as a common axis for the bearings, lands, and inner surface of the shell ends. This, in turn, produces the desired alignment of the machine components, including concentric rotor and stator members as well as co-axial bearings and shaft.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a view in perspective on one end of a dynamoelectric machine having a frame incorporating the preferred form of the present invention;

FIG. 2 is an enlarged partial view in cross-section of the other end frame member not seen in FIG. 1;

FIG. 3 is an enlarged partial view of the cast end frame member of FIG. 1, showing the side thereof facing the interior of the machine; and FIG. 4 is an enlarged view in perspective of a portion of the connection between the end frame and the end of the frame shell seen in FIG. 1.

Referring now to the drawing in more detail, numeral 10 generally signifies a dynamoelectric machine of the totally enclosed double shaft extension type, such as an electric motor, incorporating a housing or frame construction with the preferred form of the present invention.

In the illustrated embodiment, the machine frame is formed by a central generally imperforate shell 11 whose ends are closed by a pair of end frames 12 and 13 respectively which serve to support rotor shaft 14. With reference to the shell, it is punched out of a relatively thin elongated rectangular sheet of suitable material such as steel rolled into a generally tubular form having an axial length of predetermined size with edges 15 secured together in abutting or overlapping relation by a welded seam 16 extending the axial length of the shell. Intermediate its ends 17 and 18 the shell supports a conventional stator core (not shown) such as that illustrated in aforementioned Morrill patents. By way of example, the stator core is attached to the shell at four equally and angularly spaced apart locations as by a pressure fit between the engaging surfaces of the core periphery and the shell. Adjacent one of its ends, shell 11 includes a circular opening through which power supply leads 19 enter the motor to energize the windings. The shell and leads are sealed by a conventional grommet 20 or other standard sealing member.

Turning now to the illustrated form of end frames 12 and 13, it will be seen from the drawing that for purposes of disclosure they are of similar construction, each having a supporting member 21 cast from suitable, structurally strong or stiff material such as aluminum. Centrally of member 21 is integrally provided a housing or hub section 22 integrally joined to a radial support wall 23 by a number of radial spokes or spiders 24 arranged angularly around the housing. For those applications which require a totally enclosed structure, structurally weak knockout regions 26, less in cross-section thickness than wall 23, may be cast between spiders 24 to form a generally imperforate member. In the event that ventilation openings are desired through the end frame for admitting coolant or the like to the interior of the frame, the knockout regions may readily be removed by a hammer blow or other sharp impact means. Another weakened removable region, designated at 27, may also be cast in wall 23 to provide a circular opening for accommodating or mounting a standard thermal winding protector switch or other motor switch device (not shown) which is accessible from a location externally of the frame.

Inwardly of hub section 22 is provided an integral bearing hub 28 which securely mounts a standard sleeve type bearing 29 therein, as by a pressure fit, the bearing has the conventional smooth bore 31 for journalling one end of shaft 14. Section 22 and the bearing hub 28 are joined together by a pair of walls 32, 33 (FIG. 3) which together with the outer housing provide a cavity for accommodating lubricant retaining means (not shown). As seen in FIG. 1, the outboard side of housing section 22 is closed by a generally cup-shaped cap 34 having a snap fit therewith and a central inturned flanged hole 35 permitting exit of the shaft beyond the confines of the motor. The cap also performs the usual sealing function with the outer surface of the shaft.

Turning now to an important aspect of the present invention, the connection between end frame member 21 and the associated end of shell 11 tends to correct any deviation that the internal surface of the shell end might have taken from a true circle during its fabrication or when the stator core was connected to the internal shell walls, as by the pressure fit therewith.' In the preferred embodiment, the connection also furnishes a totally enclosed construction. More specifically, it will be observed from the drawing that cast member 21 terminates in a circular periphery approximating the theoretical outer configuration of the shell 11. Adjacent the periphery, disposed toward the associated end of the shell, wall 23 of casting 21 has a number of identical angularly and equally spaced apart cast-in axial recesses or depressions 41 which form an equal number of axially projecting, angularly interrupted radial surfaces 42 intermediate adjacent depressions, the surfaces 42 engaging the extreme edge of the end of shell 11. Preferably surfaces 42 are located in a common plane formed perpendicular to the axis of bearing 29 which is also in effect the rotational axis for the machine, designated by the letter A in FIG. 2. The depression and radial surfaces in wall 23 are joined together by smooth curves 43 for permitting ease in the casting operation.

Directly below these depressions and surfaces is integrally provided a generally annular structurally strong or stiff axial extension or flange, denoted by numeral 44, which extends toward the interior of the machine. Ribs 45 may be cast on the interior face of wall 23 to augment the structural rigidity of the flange. This flange has a number of angularly spaced apart radial interruptions 46, defining a corresponding number of lands 47 axially adjacent and in open communication with each depression 41. The lands and axially adjacent depressions are substantially co-extensive is angular length. In the same way, the interruptions in flange 44 are placed next to radial surfaces 42. Preferably, the lands 47 are the same or less distance from axis A as are the bottoms of depressions 41 where they join the lands. As will be seen more clearly from the description hereinafter, among other things, the foregoing arrangement allows axial and radial deflection of the shell end and permits the connection to be totally enclosed.

Returning to a description of lands 47, each is arcuate-shaped in a transverse direction having an outer surface serving as a seat for a portion of the inner surface of shell 11. The curvature of the lands are all arcs of the same circle having a common center of revolution at the center of the bearing or revolution axis A, the lands further being substantially parallel to that axis. Preferably, the diameter across the lands, from one outer surface to another should approximate or be slightly greater than the theoretical, nominal diameter of the internal surface at the end of shell 11. With this relation, the outer surfaces of lands 47 will tend to deflect the weaker shell radially intermediate adjacent lands in the manner akin to a chord subtending an arc between the adjacent lands and the shell is forced into a circular form havig a center at axis A when member 21 is drawn tightly against the end of the shell.

It should be noted at this time that only two diametrically opposed through-bolts are needed for this drawing action and to hold the end frames and shell firmly together. Thus, as seen in FIG. 3, diametrically opposed interruptions 46a may be provided entirely through the flange to permit suitable holes 49 to extend through member 21 for accommodating through-bolts 51 which extend axially through the frame, directly below shell 11. In addition, flange 44 may be entirely interrupted as indicated at 46b in a radial direction over circular region 27, if desired. None of these radial interruptions, even though total, adversely affect the strength of flange 47.

In order to obtain the maximum benefit of the present invention and to insure that the proper radial deflection is imparted to shell 11 by lands 47, I prefer to form the lands each with an angular length between 10° and 30° and have sum of their angular lengths approach 50% of the total circumference thereof. This not only produces a low unit force on any one land, as the shell deflects, but also tends to provide controlled radial deflecting action of the shell between adjacent lands. Also the lands should be disposed around flange 44 in diametrically opposed relation. In addition, I prefer to machine the lands 47 to the desired dimensions so that as best seen in FIG. 4, a slight axial ridge 53 of the same radius as the lands joins adjacent lands together and makes certain by radial shoulder 54 that the outer surface of the lands are below their associated depressions. Consequently, radial surfaces 42, depressions 41, and lands 47 are all in effect in overlapping relation to produce a totally enclosed connection with respect to the inner surface of shell 11. It should also be noted that ridges 53 and shoulders 54, if properly chosen for a given size of motor, will not interfere with the axial and radial cooperation described above between surfaces 42 and flange 44 of cast member 21 and the inherently weaker and deflectable shell 11.

For example, in actual practice a number of motors were constructed with a stationary frame made in accordance with the preferred embodiment described above. The shell, formed of steel and covered with a thin layer of paint, had a thickness of .050 inch and a theoretically nominal internal diameter of 3.700 inches. The lands, as cast, included a diameter of 3.725 inches (±.005) and were machined down to a diameter of 3.700–3.699 inches. After the end frames were assembled together with the shell and the through-bolts 51 tightened a predetermined amount to draw the parts firmly together, the bearings and shaft were provided with excellent alignment, the shaft turning freely therein. Further, the rotor and stator were concentrically disposed within shell 11. All this was achieved while ease in casting of members 21 was permitted and a structually strong, totally enclosed connection was furnished between each end frame and the associated ends of shell 11.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a dynamoelectric machine having a stationary frame supporting a shaft; a substantially tubular shell and an end frame member mounting a bearing and being connected to one end of said shell; said member having a radial wall and an axially extending flange formed inwardly of said radial wall, said flange having a number of angularly spaced apart radial interruptions defining axial extensions therebetween, said radial wall including angularly spaced apart axial depressions arranged adjacent a majority of said extensions with said axial depressions forming axially protruding radial surfaces therebetween for engaging the associated edge of said shell; said axial extensions being of greater structural stiffness than the associated end of said shell, each said axial extension having a transversely curved, radial, outer surface and being connected to an adjacent axial extension by an axially extending ridge, said curved radial outer surfaces being in engaging relation to the inner surface of the shell end thereby tending to force said shell into a circular form with said axial depressions compensating for axial irregularities of said shell end; said radial surfaces, axially extending ridges, and curved outer surfaces of said axial extensions together forming a totally enclosed connection with the associated end of said shell.

2. In a dynamoelectric machine having a stationary frame supporting a shaft; a substantially tubular shell and an end frame member mounting a bearing and being connected to one end of said shell; said member having a radial wall in engagement with the edge of said shell and an annular axially extending flange formed inwardly of said radial wall, said flange having a number of angularly spaced apart radial interruptions out of contact with said shell and defining axial extensions therebetween, said axial extensions being of greater structural stiffness than the associated end of said shell and including transversely curved radially outer surfaces, said outer surfaces of said axial extensions firmly engaging the inner surface of the shell end thereby tending to force said shell into a circular form with said shell end deflecting radially between adjacent axial extensions, and ridge means of generally the same radius as said interruptions joining adjacent axial extensions.

3. In a dynamoelectric machine having a stationary frame supporting a shaft; a substantially tubular shell fabricated of sheet material and an end frame member mounting a bearing centrally thereof and being connected to one end of said shell; said cast member having a radial wall and an annular, axially extending flange formed inwardly of said radial wall; said flange including a number of angularly spaced apart radial interruptions out of contact with said shell and defining lands therebetween, and means for circumferentially joining adjacent lands; said lands including transversely curved, radial outer surfaces defining arcs being substantially of the same circle, with each arc having a common center of revolution at the rotational axis of the machine; said radial wall including angularly spaced apart axial depressions arranged in communication with the majority of said lands and out of contact with the end of said shell; said depressions forming axially protruding radial surfaces on said radial wall intermediate said lands, with said radial surfaces being disposed in a common plane substantially perpendicular to the axis of the machine and in engaging relation to the end of the shell; the outer surfaces of said lands being in firm engagement with the inner surface of the shell and having a greater stiffness than the associated end of said shell thereby tending to force said associated shell end into a circular form having a center at the rotational axis of the machine; and the outer surfaces of said lands being located no further away from the axis of rotation of the machine than the associated axial depressions, with said axially protruding, radial outer surfaces, said circumferential joining means, and said lands together forming a totally enclosed connection with said shell.

4. In a dynamoelectric machine having a totally enclosed stationary frame supporting a shaft; a substantially tubular shell fabricated of sheet material and an end frame supporting member formed of cast material mounting a bearing centrally thereof and being connected to one end of said shell; said cast member having a radial wall terminating in a generally circular periphery and an annular, axially extending flange formed inwardly of said radial wall; said cast member further having weakened regions intermediate the bearing and its periphery capable of removed for admitting ventilating fluid therethrough; said flange including a number of angularly spaced apart radial interruptions out of engagement with said shell and defining lands therebetween; ridge means extending across said radial interruptions for joining adjacent lands; said lands including transversely curved, radial outer surfaces defining arcs being substantially of the same circle, with each arc having a common center of revolution at the rotational axis of the machine; said radial wall including axial depressions arranged in communication with substantially all of said lands and out of engagement with said shell, with the axial depressions and associated lands being angularly co-extensive in length; said radial wall and axial depressions together forming axially protruding radial surfaces intermediate said lands disposed in a common plane substantially perpendicular to the axis of the machine and in engagement with the end of said shell; the outer surfaces of said lands providing an interference fit with the inner surface of the shell and having greater structural stiffness than the ends of said shell thereby tending to force said associated shell end into a circular form having a center at the rotational axis of the machine; and the outer surfaces of said lands being located no further away from the axis of rotation of the machine than the associated axial depressions, with adjacent axially protruding radial surfaces, ridge means and lands being in overlapping relation to form a totally enclosed connection with said shell.

References Cited by the Examiner

UNITED STATES PATENTS 2,464,017　3/1949　Berghorn _____ 310—254

MILTON O. HIRSHFIELD, *Primary Examiner.*

J. W. GIBBS, *Assistant Examiner.*